United States Patent [19]

Titus, IV et al.

[11] 4,352,173
[45] Sep. 28, 1982

[54] DICTATION DISPLAY DEVICE

[75] Inventors: Theodore Titus, IV, Tucker; Julius B. Bagley, Atlanta, both of Ga.

[73] Assignee: Lanier Business Products, Inc., Atlanta, Ga.

[21] Appl. No.: 27,990

[22] Filed: Apr. 9, 1979

[51] Int. Cl.³ .............................................. G11B 27/34
[52] U.S. Cl. ........................................ 369/27; 369/57; 369/58; 360/137
[58] Field of Search ............ 179/100.1 DR; 360/72.1, 360/72.2, 72.3, 137; 340/675; 369/27, 56, 57, 58

[56] References Cited

U.S. PATENT DOCUMENTS

| | | | |
|---|---|---|---|
| 3,431,367 | 3/1969 | Nickl | 179/100.1 PS |
| 3,573,360 | 4/1971 | Rose | 360/72.2 |
| 3,869,720 | 3/1975 | Ohira et al. | 360/72.1 |
| 3,882,545 | 5/1975 | Titus | 360/137 |
| 4,051,540 | 9/1977 | Wilder et al. | 179/100.1 DR X |
| 4,092,680 | 5/1978 | Sander | 179/100.1 DR X |
| 4,172,231 | 10/1979 | d'Alayer de Costemore | 360/72.3 XR |
| 4,200,893 | 4/1980 | Matison | 360/72.1 |
| 4,214,281 | 7/1980 | Sato et al. | 360/137 |

FOREIGN PATENT DOCUMENTS

| | | | |
|---|---|---|---|
| 2644407 | 12/1977 | Fed. Rep. of Germany | 360/137 |
| 2811018 | 9/1978 | Fed. Rep. of Germany | 360/137 |
| 2837645 | 3/1979 | Fed. Rep. of Germany | 360/137 |
| 2830464 | 4/1979 | Fed. Rep. of Germany | 360/137 |
| 2838078 | 4/1979 | Fed. Rep. of Germany | 360/137 |
| 2842613 | 4/1979 | Fed. Rep. of Germany | 360/137 |
| 2754368 | 6/1979 | Fed. Rep. of Germany | 360/137 |
| 2816732 | 7/1979 | Fed. Rep. of Germany | 360/137 |
| 1117030 | 6/1968 | United Kingdom | 360/72.3 |
| 1542195 | 3/1979 | United Kingdom | 360/137 |
| 2003631 | 3/1979 | United Kingdom | 360/137 |
| 2003684 | 3/1979 | United Kingdom | 360/137 |

Primary Examiner—Stuart N. Hecker
Attorney, Agent, or Firm—Jones & Askew

[57] ABSTRACT

A display device for use in a dictation transcription station comprising a plurality of selectively actuatable lighted segments (10). A pair of shift registers (25, 26) are used to retain information as to the location of recorded signals denoting ends of dictation segments and location of instructions. As rewound tape is transcribed a third shift register (27) creates a shutter comprising contiguous lighted segments which moves to the right during a transcription operation. Control circuitry (67, 62) allow shifting of the registers containing the end of segment and instruction marks to occur only when the tape is rewound past the farthest point reached during a previous rewinding operation. A display for a dictation recorder is also shown wherein a pair of up down counters (130, 145) control numerical displays representing the total length of tape used (20) and the length of the present dictation segment (21). Apparatus which is sensitive to rewinding of the tape into a previous dictation segment (165, 28) is used to control the present segment counter. The present segment counter may be selectively made (169, 177, 150) to begin counting again upon either entry into the next dictation segment encountered during forward advance or the segment in which dictation was occurring when the rewound operation was initiated.

12 Claims, 7 Drawing Figures

Fig_1A

Fig_1B

Fig_1C

DICTATION DISPLAY DEVICE

DESCRIPTION

TECHNICAL FIELD

The present invention relates to dictation recording and transcription systems and to displays for use in connection with dictate stations and transcribe stations which alert the users thereof to the mode in which the equipment is currently operating, and various parameters of dictation segments.

BACKGROUND OF THE INVENTION

In dictation recording and transcribing equipment it is desirable to alert both the dictator and the transcriber to various states of machine operation and parameters of dictation segments.

In dictation equipment using discrete record members, such as tape cassettes, it is desirable not only to provide information to the transcriber as to the mode in which a transcribe unit is operating, but also to provide a visual display denoting the end points of dictation segments and the location of certain instructions which have been recorded on the tape. It is known in the art to provide mechanical counters on dictation units which are coupled to a tape transport in order to indicate the amount of tape in a particular cassette which has been transcribed. Furthermore, it is known to provide a linear strip upon which visible indications of the ends of dictation segments and the location of instructions are printed either by ink, use of heat sensitive paper, or some other means.

More recent developments have provided a plurality of light-emitting segments which are maintained in a lit or unlit state as signals of a particular characteristic are located during a rewind operation. Such diaplays use a linear array of light emitting segments, each of which corresponds to a certain position on the tape in a discrete tape carrier. Conventionally the right-hand side (as the user faces the display) represents the end of the tape and the left-hand side represents the beginning. Regardless of which side of the array represents which end of the tape, these displays have entered the signal from the end of the display which represents the end of tape. When less than all of the tape in a discrete tape carrier has been used for dictation the physical end of the recording tape is reached prior to the end of the array. Therefore, this type of display requires that two steps be carried out by the operator in order to make the information in the display most useful. First the operator must completely rewind the tape in the discrete tape carrier in order to "fill" the display with the information available on the tape as to location of ends of dictation segments and locations of instructions. Secondly, when the physical beginning of the tape is reached the entire contents of the display must be justified (conventionally to the left) in order that the beginning of the physical tape corresponds to the portion of the array which represents the beginning of the tape.

At a dictate station in a dictation recording and transcribing system it has been known to provide a visible indication that a dictate station is operating in a recording mode. It has further been known to provide indicia on a strip of paper or the like which will indicate to the user the length of the dictation segment currently being dictated.

SUMMARY OF THE INVENTION

The present invention provides a visual display unit for both a dictate station and a transcribe station in a dictation recording and transcription system. According to one aspect of the present invention, a plurality of selectively actuable visible indicators, which preferably comprise lighted segments is provided, each of which represents a location on the recording medium of a discrete recording member such as a conventional tape cassette. The array of lighted segments is preferably linear and one end of this array (preferably the left-hand end as viewed by the user) always represents the location of the farthest point reached when the tape is winding in a predetermined direction.

According to a preferred form of the present invention when an unrewound tape containing dictation is supplied to the transcribe station and rewinding toward the beginning of the tape is commenced, the leftmost segment of the array represents the farthest point reached during rewind. This point is closest to the beginning of the tape that has been reached. If the tape is subsequently moved in a forward direction, the leftmost segment of the array will still represent the point nearest the beginning of the tape that has been reached during any previous rewinding of that tape.

According to another aspect of the present invention, control circuitry is provided which is responsive to the detection of signals denoting the end of a dictation segment and the location of instructions for the transcriber. The control circuitry is arranged so that the location of one type of mark will be represented by a steadily illuminated segment of the array, and the location of the other type of mark will be represented by an intermittently lighted segment of the array.

According to still another aspect of the present invention, signals denoting the location of ends of dictation segments and locations of instruction signals are always entered from one end of the array (preferably the left). Since the same end of the array represents the farthest position reached on the tape by winding in a predetermined direction (conventionally rewind), a display is provided which requires no separate justification operation in order to provide the user with a visual display which accurately represents the tape within the tape carrier.

When rewinding stops and forward tape movement begins a shutter is provided which comprises a contiguous set of the lighted segments beginning at the leftmost segment. As forward movement of the tape progresses, the right hand end of the shutter moves to the right. If rewinding is again commenced, the shutter retreats toward the left hand side of the array until it disappears when the farthest point reached during a previous rewind is again reached. If rewinding continues, the leftmost segment of the array continuously represents the new farthest point reached during rewind and the lighted segments indicating ends of dictation segments and instructions are shifted to the right.

According to another aspect of the present invention, preferably used in a dictate station, displays are provided which represent both the cumulative amount of tape in the tape carrier which has been used and the length of the present dictation segment. The display representing length of the present dictation segment may selectively be rendered unresponsive to tape movement when the user rewinds the tape into a previous dictation segment, or may be made responsive to tape movement upon entry into a previously recorded dictation segment.

According to still another aspect of the present invention, a lighted segment which indicates to the dictator when a predetermined amount of tape remains for the recording of dictation is provided and also indicates when the end of tape has been reached.

Other new and useful aspects of the present invention will apparent to those skilled in the art from the detailed description of the preferred embodiment which follows.

DETAILED DESCRIPTION

Figure 1A:
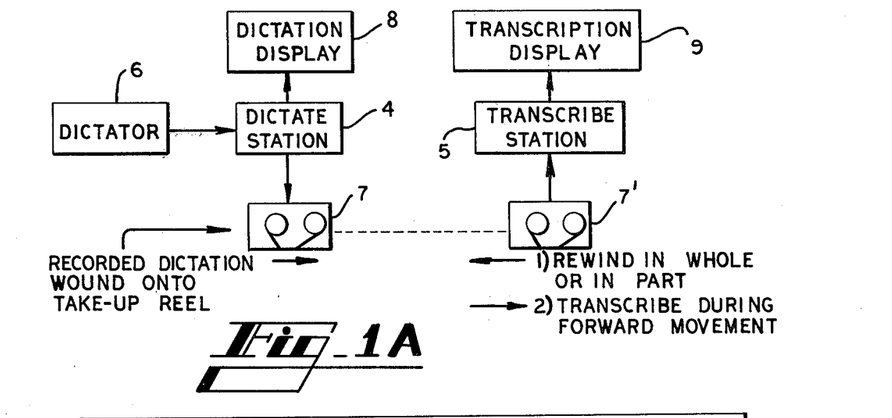
FIG. 1A is a block diagram of an environment of the present invention.

FIG. 1A shows an environment of the present invention wherein a dictator 6 records dictation at a dictate station 4 on a tape cassette 7. Various parameters of the dictation being recorded are displayed on dictation display 8 which is a part of the present invention.

A cassette containing recorded dictation is shown as 7' and is supplied to transcribe station 5 for transcription. The progress of a transcription operation taking place at transcribe station 5 is monitored on transcription display 9 which comprises a part of the present invention.

Figure 1B:
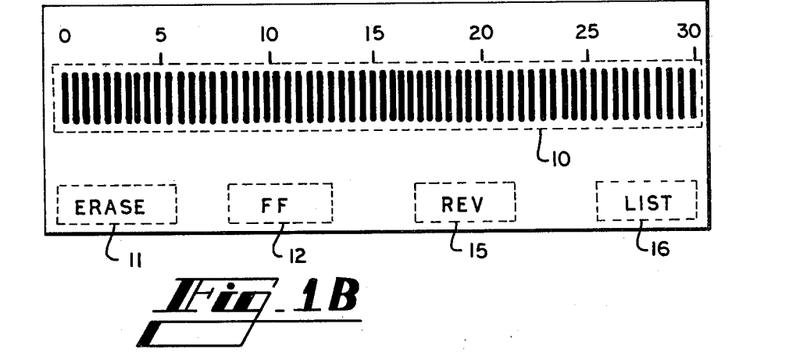
FIG. 1B is a pictorial view of the preferred display output for a transcribe station in the preferred embodiment of the present invention.

FIG. 1B shows the display output for a transcription station of the preferred embodiment of the present invention. This display comprises an array 10 of selectively actuable lighted segments which in the preferred embodiment disclosed comprises a linear array of sixty individual segments. The array of the preferred embodiment is selected to accommodate standard C-60 cassettes which will accept thirty minutes of recorded dictation per side. Each segment in the preferred embodiment represents approximately one-half minute of recording tape in a C-60 cassette. It is of course possible to use a greater or lesser number of segments in the array and the choice of sixty disclosed herein is an implementation of the preferred embodiment and should not be construed to limit the scope of the present invention.

The preferred embodiment of the transcription display also includes selectively actuable segments 11, 12, 15 and 16 which are illuminated when the transcription unit is in an erase, fast forward, reverse, and listen mode respectively. Throughout this description these segments shall be referred to as mode segments.

Each of the segments shown in FIG. 1B, whether mode segments or segments of linear array 10, may comprise any selectively actuatable light source. As shown herein, each segment comprises a light-emitting diode (LED). The economics of manufacturing indicate that production of a large number of identical displays could be economically implemented by making each segment an individual segment of a single liquid crystal display. It will be understood that any actuatable light source including light bulbs, may be used to construct an embodiment of the transcription display of the present invention.

Figure 1C:
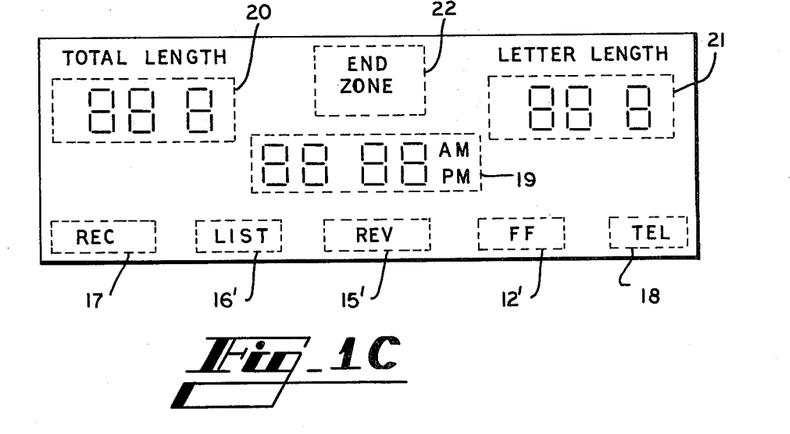
FIG. 1C is a pictorial view of the preferred display section for a dictation station in the preferred embodiment of the present invention.

FIG. 1C shows the preferred embodiment of the display unit for a dictate station. The dictation display also includes mode segments 17, 16', 15', 12' and 18 which are illuminated when the dictate station is in a record, listen, reverse, fast forward, and telephone mode respectively. The telephone mode which illuminates mode segment 18, indicates that the source of the input signal to the dictate station is a telephone interface. Such telephone interfaces are available as part of conventional PBX equipment and the interface per se forms no part of the present invention.

End zone segment 22 is another selectively actuatable light segment, the function of which will be described in greater detail below.

Total length segment 20 shows a numerical readout indicating the total amount of tape upon which dictation has been recorded. In the preferred embodiment shown in FIG. 1C, total length segment 20 comprises a three digit numerical display, two for representing minutes, and the third digit representing tenths of minutes. Each numeral in total length display 20 is formed by a conventional seven segment device and may be embodied by a seven segment LED displays, liquid crystal displays, nixie tubes, or the like.

Letter length segment 21 indicates the length of the present dictation segment. Dictation segments in the environment of the present invention are defined as segments falling between "end marks" recorded on the tape. The operation of letter length segment 21 and its response to certain function control commands will be described in greater detail below.

The preferred embodiment of the dictation display also includes a conventional real time clock 19 which per se forms no part of the present invention but is included for the convenience of the user.

TRANSCRIPTION DISPLAY OUTPUT

The output of the transcription display shown in FIG. 1B as it relates to operation of a transcription station by a user will now be explained. This section of the disclosure will indicate the functioning of the output display as it relates to operations performed by a transcriber and the circuitry controlling the operation of this display will be described in the section immediately following the present section.

In the transcription display of the present invention each segment of linear array 10 represents a certain location on the tape in a cassette being transcribed. It is considered desirable in a transcription display to have a particular end of the display represent the farthest point to which the tape has been wound in a given direction. Conventionally, dictated cassettes provided to a transcriber are left in an unrewound configuration. In most western countries, the convention of reading from left to right is prevalent. Therefore, in the preferred embodiment, the left-hand end of linear array 10 is chosen as representing the farthest point to which the cassette being transcribed has been rewound during all previous rewind operations. It is of course possible to use a configuration of lighted segments other than a linear array and to select another point on the array to represent the farthest point to which the tape has been rewound. However, it is considered preferable to use a linear array and furthermore considered preferable that the left-hand end of the array represent the farthest rewound position.

The environment of the present invention contemplates that the tape provided to the transcriptionist will contain both recorded dictation and recorded end marks (E marks) and instruction marks (I marks). The E marks recorded on the tape denote the end of a segment of dictation such as a letter or a memorandum. The I marks recorded on the tape are used to alert the transcriptionist to the location of instructions recorded on the tape by the dictator. A system for recording E marks and I marks of the type described above is disclosed in U.S. Pat. No. 4,024,354 assigned to the same assignee as the present invention.

Upon placing a cassette upon which dictation, E marks, and I marks have been recorded in a transcription unit, the transcriber will conventionally first begin to rewind the tape. The first mark to be encountered will be the last E mark on the tape denoting the end of the last dictation segment. This end mark will appear by lighting the farthest left-hand segment of linear array 10 and maintaining it in a constantly lit state. As the rewinding of the tape proceeds, the farthest left-hand element of linear array 10 will be extinguished and the next contiguous element of linear array 10 to the right will become illuminated. Since the spacing between each element of linear array 10 represents approximately thirty seconds of recording tape, each time thirty seconds of tape (approximately fifty-six inches for conventional cassettes) is rewound, the lighted segment representing the last end mark will be shifted to the right one segment.

If the last dictation segment recorded on the tape was five minutes long, the next to last end mark will appear at the farthest left-hand element of the array 10 when the lighted segment representing the last end mark is at the tenth segment from the left-hand end of array 10, i.e., under the numeral 5 which appears in FIG. 1B. The illuminated segments representing end marks will continue to shift to the right so long as the tape is being rewound. Assume the next mark encountered on the tape being rewound is an instruction mark. Instruction marks appear at the left-hand end of the display as an intermittently lit segments of array 10 and thus the segment representing the location of an I mark will flash or blink in the display. As the tape continues to be rewound, the flashing segment representing location of instruction mark will be shifted to the right in the same manner as the constantly lit segments representing end marks.

If at any time the rewinding procedure terminates, and the transcriptionist begins listening to the rewound portion of the tape, a second mode of display for array 10 is initiated. As the transcriptionist winds the tape forward, as will be done when listening to tape while transcribing it, the farthest left-hand segment of the array 10 will continue to represent the segment of tape nearest the beginning of dictation that has been reached during rewind. This will be referred to as the farthest rewound position of the tape. As listening continues, each segment from the left-hand end of array 10 proceeding to the right will become continuously lit and remain continuously lit. It may therefore be seen that a "shutter" is provided which indicates to the transcriber how far from the farthest rewound position the tape has been advanced in a forward direction.

Thus, if the transcriber has listened to five minutes of dictation (or wound through five minutes of tape in a fast forward mode) from the farthest rewound position, the ten segments at the left-hand end of array 10 will remain constantly lit indicating that the transcriber has advanced in a forward direction through five minutes of dictation from the farthest rewound position. It may therefore be seen that the shutter which appears on array 10 comprises a plurality of continuously illuminated contiguous segments. As the shutter advances over a blinking segment indicating the presence of an I mark or a constantly lit segment indicating the presence of an E mark, the segment will remain continuously lit since it is then included in the shutter.

Continuing with the example, assume that the transcriber listened to five minutes of tape from the farthest rewound position thus illuminating the ten left-handmost segments of array 10. Assume further that the transcriber then recommences rewinding of the tape. As the tape is rewound, the shutter will retreat back toward the left-hand end of array 10. Any segments which have been in the shutter that represent locations of E marks or I marks will continue to represent E marks or I marks as the shutter retreats and thus, E mark segments will remain continuously lit and I mark segments will blink on and off once the shutter has retreated to the left past these locations.

Assume that the tape is rewound past the previous farthest rewind position and rewinding continues. When the farthest rewound position is reached, the shutter disappears since it will have retreated all the way to the left-hand end of array 10. As rewinding continues, a new farthest rewound position is established, and all E marks and I marks located in the display will again proceed to be shifted to the right for each thirty seconds of tape rewound. As additional E marks or I marks are encountered on the tape during this rewind operation, such marks will be entered from the left-hand end of array 10 as described above.

Again, if at any point the transcriber proceeds to advance the tape in a forward direction, the left-hand end of array 10 will represent the new farthest rewound position and the shutter will proceed to advance to the right as tape is advanced in a forward direction.

Therefore it may be seen that the farthest left-hand segment of array 10 always represents the farthest rewound position and the presence or absence of the shutter will always indicate to the user whether he or she has advanced the tape in a forward direction from the farthest rewound position.

Furthermore, consider that only twenty minutes of dictation was recorded on the tape within the transcribe unit. If the tape is completely rewound, the farthest right-hand end mark (representing the end of dictation on the tape) will appear at the fortieth segment from the left under the numeral 20 when the tape is completely rewound. Therefore, upon complete rewinding of the tape, the display which appears in array 10 will always be properly justified.

It will be further apparent that if the tape is only partially rewound before transcription begins, the display which appears in array 10 will also be properly justified since the left-hand end of array 10 will represent the point at which forward advance of the tape began. This feature represents a significance advance over prior lighted segment displays for transcribe units in that the display which appears in the array is constantly justified and requires no separate step of justification after a rewinding operation. It furthermore allows the display to always remain properly justified whether the tape being transcribed has been completely rewound or only partially rewound.

TRANSCRIPTION DISPLAY CIRCUITRY

Figure 2A:
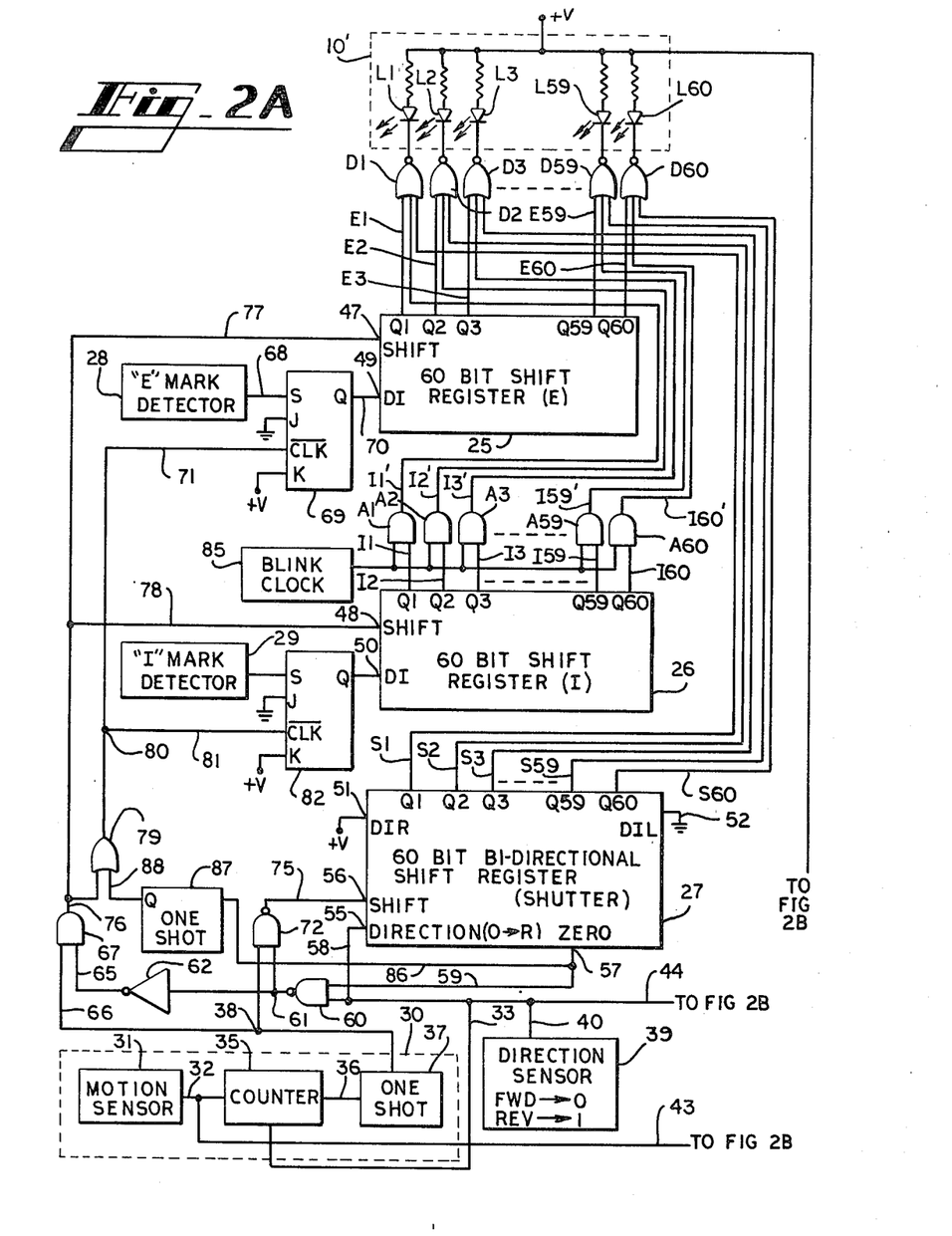
FIG. 2A is a schematic diagram of a preferred embodiment of the circuitry controlling the transcription display array of FIG. 1B.
Figure 2B:
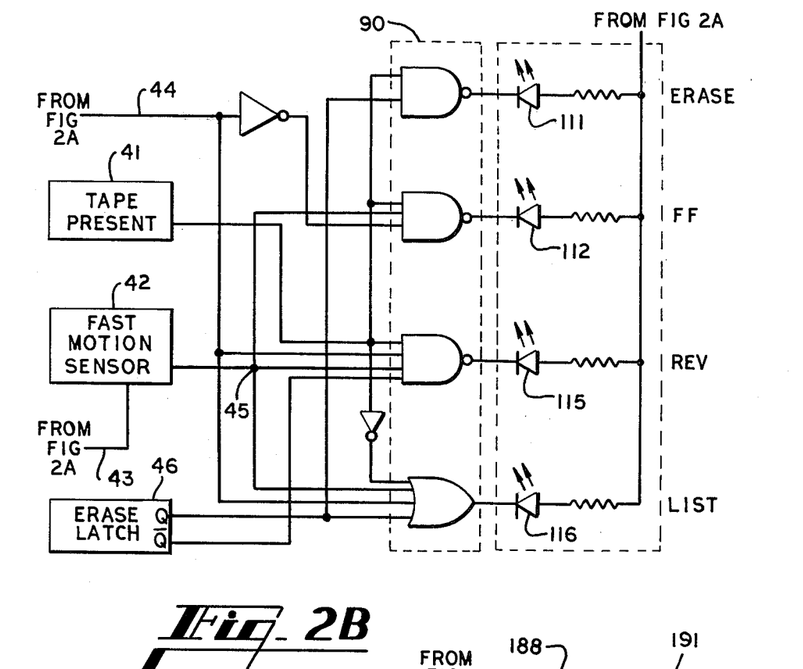
FIG. 2B is a schematic diagram of the circuitry controlling the transcription display function segments.

FIGS. 2A and 2B show a preferred embodiment of the circuitry controlling the transcription display of the present invention. It will be appreciated by those skilled in the art from the description to follow of the circuitry of FIGS. 2A and 2B that this circuitry will implement the functions of the transcription display described in the previous section.

The circuitry of FIG. 2A controls array 10 shown in FIG. 1B. The preferred embodiment disclosed herein is constructed using a plurality of sixty bit shift registers, 25, 26, and 27. As will be known to those skilled in the art, shift registers are memory devices which may be clocked to move the contents of a particular memory location to the next contiguous memory location in a given direction. It will be apparent to those skilled in the art that sixty bit shift regmsters may be constructed using large scale integration, or a combination of smaller medium scale integrated circuits. As used throughout this specification, the concept of contiguous memory locations comprises memory locations which are contiguous in address, without regard to the physical proximity of the memory locations. It will therefore be apparent, that embodiments of the present invention may be constructed using random access memories which are controlled by a microprocessor and that in such an embodiment, contiguous memory locations comprise memory locations with contiguous addresses according to the addressing scheme of the microprocessor being used. Without regard to whether a sixty bit shift register is constructed as a unitary package, or a combination of smaller medium scale integrated circuit shift registers, registers 25, 26 and 27 have been shown as single devices for the sake of clarity.

As will become apparent from the description below, shift register 25 contains signals representing the location of E marks, shift register 26 contains signals corresponding to the location of I marks and shift register 27 contains signals controlling the location of the shutter. Shift registers 25 and 26 are unidirectional and will be referred to as the E shift register and the I shift register, respectively, while shift register 27 is bidirectional and will be referred to as the shutter shift register.

As is known to those skilled in the art, the contents of such shift registers may be set to zero either through the use of a direct clear input or through the parallel loading of zeros into all memory locations. Such an operation is desirable upon the ejection of a tape from the transcription unit. Implementation of this function will be apparent to those skilled in the art, and such implementation has been omitted from the circuitry of FIG. 2A for the sake of clarity.

The outputs of shift registers 25, 26 and 27 are coupled through driver NOR gates D1, D2, D3-D59, and D60. Driver NOR gates D1-D60 control light emitting diodes L1, L2, L3-L59, and L60. As shown on FIG. 2A, light emitting diodes L1-L60 comprise an array 10' of selectively actuatable light sources corresponding to array 10 shown in FIG. 1A.

It will be understood that NOR gate drivers D1-D60 represent 60 NOR gate drivers and that drivers D4-D58 have been omitted from FIG. 2A for clarity.

E mark detector 28 is responsive to the detection of E mark signals recorded on the tape in the transcribe unit. It will be understood that E mark detector 28 responds to the presence of recorded E marks when the tape is running in a fast wind mode. Similarly, I mark detector 29 responds to the presence of I mark signals recorded on the tape in the transcription unit during fast winding. Such detectors may be implemented in a known manner by using two filters which respond to the frequencies of the respective signals over the range of possible fast wind speeds. Furthermore, such a detector for the fast wind mode is disclosed in U.S. Pat. No. 3,882,545 assigned to the assignee of the present invention.

It will be understood that E mark detector 28 provides a logical one output upon detection of an E mark recorded on the tape as the recorded E mark signal passes over the playback head of the transcription unit. Similarly I mark detector 29 will provide a logical one output upon detection of a signal corresponding to a recorded I mark.

The preferred embodiment of the present invention is also responsive to the presence of motion signals indicating that the tape is in motion. Block 30 of FIG. 2A shows a means for providing motion signals. This means comprises a motion sensor 31 which provides output pulses along line 32 when the tape is in motion. Such motion sensors are constructed by forming a mechanical linkage between either the supply or take-up spindles of the tape transport and providing a transducer such as a light chopper or a switch to provide pulses when the tape is in motion. An example of such a motion sensor is disclosed in U.S. Pat. No. 3,820,101 assigned to the same assignee as the present invention.

The pulses which appear on line 32 are scaled by counter 35 which provides a pulse output on line 36 when a predetermined number of pulses have appeared on line 32. Counter 35 is an up/down counter that is responsive to the direction of tape travel as shown by the connection along line 33 to direction sensor 39. It will be understood by those skilled in the art that counter 35 produces a pulse upon an overflow or an underflow condition. Since in the preferred embodiment, each segment of array 10 corresponds to approximately thirty seconds of recorded dictation and conventional cassette recording speed is used, counter 35 is selected so that it provides an output pulse on line 36 in response to a number of pulses present on line 32 which correspond to approximately fifty-six inches of tape ($1\frac{7}{8}$ inches per second times 30 seconds equals $56\frac{1}{4}$ inches). Of course other embodiments using a greater or lesser number of segments in array 10 or different tape speeds are possible. In such other embodiments the proper scaling of counter 35 is within the ordinary level of skill in the art. A pulse appearing on line 36 triggers one shot 37 which provides a motion signal pulse at point 38.

The present invention is also sensitive to the direction of tape movement. This is shown as block 39 which indicates a conventional direction sensor which provides a logical zero on line 40 when tape is moving in a forward direction and a logical one on line 40 when tape is moving in a reverse direction. Shown in FIG. 2B is tape present sensor 41 which provides a logical one output when the presence of a cassette is detected in the transcribe station and a fast motion sensor 42 which provides a logical one output to point 45 when pulses appearing on line 32 appear at a sufficient rate to indicate that the transcribe station is moving the tape in a fast wind mode. Implementation of elements 39, 40, 41 and 42 to provide the described outputs is within the level of ordinary skill in the art.

Erase latch 46 is a conventional indication that the transcribe station is in an erase mode and provides a logical one on its Q output when the transcribe station is in an erase mode, and a logical zero on its Q output when the transcribe station is not in an erase mode. The NOT Q output of erase latch 46 has a logical state that is opposite of that of the Q output.

To relate the circuitry shown in FIG. 2A to the display shown in FIG. 1A, it should be understood that LED L1 corresponds to the leftmost segment of array 10. Similarly LED L2 corresponds to the second segment from the left-hand end of array 10 and LED L60 corresponds to the rightmost segment of array 10. From inspection of FIG. 2A, it will be apparent that NOR gate driver D1 controls LED L1, NOR gate driver D2 controls LED L2, and so forth until NOR gate driver D60 controls LED L60. It may further be seen that the inputs to NOR gate driver D1 comprise the Q1 outputs of shift registers 25, 26 and 27, which appear on lines E1, I1′, and S1 respectively. It will therefore be appreciated, that in the schematic of FIG. 2A, the left-hand end of shift registers 25, 26 and 27 represent memory locations which correspond to the left-hand end of array 10 shown in FIG. 1B.

Turning once again to FIG. 1A, it will be recalled that in the conventional environment of the present invention, tape 7 is removed from dictate station 4 with recorded dictation wound onto the take-up reel. The first operation at transcribe station 5 is to rewind tape 7′ in whole or in part. It is during this rewind operation in which the circuitry shown in FIG. 2A is first activated. Rewinding a portion of the tape 7 in order to generate a display indicating the location of E marks and I marks is referred to as a scan or scanning operation. During rewind, the tape, or a track of the tape devoted to E marks and I marks, is scanned for the presence of signals indicating an E mark or an I mark. As these are located, the circuitry of FIG. 2A generates a display which indicates the positions of E marks and I marks on the tape.

Note that shift registers 25 and 26 are each provided with a shift input, 47 and 48 respectively. When a pulse is provided to such a shift input, the data stored in memory location 1 is shifted to memory location 2, the data in memory location 2 is shifted to memory location 3 and so forth. It will therefore be seen that when a pulse appears at shift input 47, the data in the memory locations of shift register 25 all shift to the next contiguous memory location. In the convention set forth herein, this data may be considered as shifting to the right as the circuit is viewed in FIG. 2A. Similarly data is shifted to the right in shift register 26 when a pulse appears at shift input 48.

Shift registers 25 and 26 are also provided with DATA IN (DI) inputs 49 and 50 respectively. The data present at DATA IN input 49 (a logical zero or a logical one) will be shifted into memory location 1 when a pulse appears on shift input 47. Similarly the data present at DATA IN input 50 will be shifted into memory location 1 of shift register 26 when a pulse appears on shift input 48.

The contents of each memory location of shift registers 25 and 26 are available on parallel outputs Q1–Q60 of each shift register. Therefore the contents of memory location 1 of shift register 25 appear on line E1 which is connected to the Q1 output of shift register 25; the contents of memory location 2 of shift register 25 appear on line E2 which is connected to the Q2 output of shift register 25; and so forth through the contents of memory location 60 of shift register 25 appearing on line E60. In a similar manner, the contents of memory locations 1–60 of shift register 26 appear on lines I1–I60.

Shutter shift register 27 is a bidirectional shift register which means that data may be shifted in either direction within the register. This shift register is provided with a direction input 55 which determines the direction in which the data shifts in the register when a pulse appears on shift input 56. As shown in FIG. 2A, a zero present on direction input 55 will cause data within register 27 to shift right when a pulse appears on SHIFT input 56 and a one on direction input 55 will cause data to shift left when SHIFT input 56 is pulsed. Some off-the-shelf bidirectional shift registers have two direction inputs which must be in opposite logical states for the data to shift right or shift left, but implementation of a single line direction input such as direction input 55 shown in FIG. 2A will be understood by one of ordinary skill in the art.

Shutter shift register 27 is provided with two serial data inputs 51 and 52. DATA INPUT RIGHT (DIR) 51 provides data which is shifted into memory location 1 when a shift right condition occurs. A shift right condition is one in which a zero appears on direction input 55 and a pulse appears on SHIFT input 56. Similarly, DATA INPUT LEFT (DIL) 52 provides data which is shifted into memory location 60 when a shift left condition (direction input 55 equals 1, pulse on SHIFT input 56) occurs. As may be seen from FIG. 2A, DIR input 51 is tied to a logical one data state and DIL input 52 is tied to a logical zero state. It may therefore be appreciated that upon each occurrence of a shift right condition a logical one will be entered in memory location 1 of shift register 27 and that upon each occurrence of a shift left condition a logical zero will be entered into memory location 60 of shift register 27.

Shift register 27 is also provided with a ZERO output 57 which goes to a logical one state when all sixty memory locations of shutter shift register 27 contain a zero. Such an output may be available on an integrated device, or may be easily implemented by a plurality of NOR gates connected to lines S1–S60. As will be apparent from the description to follow, the embodiment of the present invention which is disclosed is constructed in such a manner that a logical zero at output Q1 of shift register 27 necessarily implies that outputs Q2–Q60 are also zero. Therefore the state of ZERO output 57 may be treated simply as the logical inverse of line S1 in the embodiment shown. In FIG. 2A, the ZERO output has been shown as a single output 57 for the sake of simplicity.

Similarly, in an embodiment of the present invention using a microprocessor and sixty locations of random access memory to embody shutter shift register 27, successive testing of all sixty addresses of random access memory corresponding to shutter shift register 27 may be implemented by the microprocessor in order to determine if ZERO output 57 should be in a logical one state. Since all memory locations of shift register 27 to the left of the rightmost location containing a one will also contains ones (because DIR is tied to logical one), a microprocessor could be used to maintain a record of the rightmost location containing a one and treat all locations left of this as filled with ones. Thus it may be seen that shift register 27 comprises a memory with a plurality of memory locations which is characterized by a numerical order to the memory locations. For location N, location N+1 is the next higher memory location and location N−1 is the next lower memory location. Shifting right as shown in FIG. 2A should be considered as shifting to the next higher memory location.

Consider, that a tape such as tape 7′ as shown in FIG. 1A has been provided to the user of transcribe station 5. As shown in FIG. 1A the first operation is to rewind a portion of tape 7′ or to rewind it in its entirety. As noted above, the rewinding of a portion of tape 7′ in order to generate a display denoting the location of E marks and I marks on the tape is called a rewind scan operation. This operation is implemented whenever a tape such as 7′ is being rewound in transcribe station 5, and the tape has been wound past its previous farthest rewound position.

In the conventional environment of the present invention described above, it was noted that an E mark should be the first signal encountered upon rewinding of tape 7′. When the E mark is encountered upon rewind, E mark detector 28 provides a pulse on line 68. Line 68 is connected to the direct set (S) input of flip-flop 69 and therefore sets flip-flop 69 placing a logical one on line 70 which is connected to the Q output of flip-flop 69. As may be seen from inspection of FIG. 2A, flip-flop 69 is a JK flip-flop which includes a direct SET (S) input, a grounded J input, a K input which is tied to a logical one, and a negative edge triggered clock (CLK) input which is connected to line 71. As will be known to those skilled in the art, when a positive pulse appears at the direct set input of a JK flip-flop such as flip-flop 69, the flip-flop is set to its Q equals one state without regard to the state of the other inputs. Therefore, when E mark detector 28 detects the first E mark during a rewind scan operation, flip-flop 69 is set providing a one on line 70 to the data in input of shift register 25.

In the embodiment shown in FIG. 2A, ZERO output 57 is the parameter by which the display control circuitry determines whether it is at its farthest rewound position. Consider for a moment that a freshly dictated tape is placed in transcribe station 5 and a rewind scan operation is begun. Under these conditions, motion sensor 31 will begin to provide pulses on line 32 which will be counted by counter 35. When a predetermined number of pulses have been counted, a pulse appears on line 36 which triggers one-shot 37 providing another pulse at point 38.

Note that under a rewind scan operation, the output of direction sensor 39 which appears on line 40 is a logical one. The logical one on line 40 also appears on line 58 as the input to direction input 55 of shift register 27. Therefore, shift register 27 is conditioned to shift its contents in a left-hand direction upon receipt of a pulse at shift input 56. It is assumed herein that when the rewind scan operation begins, the contents of shift register 27 have been cleared to all zeros in a manner described above. Therefore, a logical one appears at ZERO output 57 which is provided along line 59 as an input to NAND gate 60. NAND gate 60 now has two ones as its inputs and a logical zero output of NAND gate 60 appears at point 61. The logical zero at point 61 is inverted by inverter 62 and therefore a logical one appears on line 65 as an input to AND gate 67.

Consider for a moment, that the above-referenced E mark is the only mark located prior to provision of the first motion signal at point 38 by one shot 37. Recall that in the example given, point 61 is at a logical zero state. Since point 61 is one input to NAND gate 72, the logical zero at point 61 will maintain a logical one state on line 75 preventing the shifting of data in shift register 27.

The pulse that appears at point 38 is also provided along line 66 as an input to AND gate 67. Since line 65 is in its logical one state, the appearance of a pulse on line 66 causes a corresponding pulse to appear on line 76, the output of AND gate 67. The pulse which appears on line 76 is provided along lines 77 and 78 to shift inputs 47 and 48 respectively. The appearance of a pulse at shift inputs 47 and 48, causes the data present at DATA IN inputs 49 and 50 to be shifted into the first memory locations of shift registers 25 and 26 respectively. Since the example presumes that no I mark has been detected when the first pulse appears at point 38, a zero is present at the data in input of shift register 26 and is shifted into the first memory location of this register. Since a one is present on line 70 as the input to DI input 49 of shift register 25, a logical one is shifted into the first memory location of shift register 25.

The pulse which appears on line 76 is also provided as one input to OR gate 79. Through the action of OR gate 79 the pulse appears at point 80 and is provided along lines 71 and 81 to the clock inputs of flip-flops 69 and 82 respectively.

As described above, flip-flops 69 and 82 have clock inputs which are negative edge triggered. Therefore, as will be known to those skilled in the art, the outputs of flip-flops 69 and 82 are not affected by the rising edge or the logical one state of the pulses appearing on lines 71 and 81 but the flip-flop is triggered on the falling edge of the pulses. Since both flip-flops 69 and 82 have their J inputs connected to a logical zero state and their K inputs connected to a logical one state, the appearance of a falling edge on their clock inputs will cause the flip-flops either to toggle or remain in a Q equals zero state. It may therefore be appreciated that, in the example given, flip-flop 82 will remain in its Q equals zero state, and flip-flop 69 will be cleared from its Q equals one state to its Q equals zero state. It will further be appreciated that the clearing of flip-flop 69 occurs after the logical one formerly present on line 70 has been shifted into the first memory location of shift register 25.

As will be apparent from inspection of FIG. 2A, I mark detector 29 and flip-flop 82 provide inputs to DATA IN input of shift register 26 in a fashion which duplicates the operation of E mark detector 28 and flip-flop 69 with respect to DATA IN input 49 of shift register 25. If during the period between the appearance of the first motion pulse at point 38 and the second motion pulse an I mark is detected by I mark detector 29, then upon the appearance of the second motion pulse, a logical one will be shifted into the first memory location of shift register 26. The falling edge of the pulse which appears on line 81 will clear flip-flop 82 after the aforementioned logical one has been shifted into the first memory location.

Thus it may be seen that when an E mark is detected by detector 28, flip-flop 69 will be set to enter a logical one into the first memory location of shift register 25 upon the next occurrence of a tape motion signal at point 38. Similarly detection of an I mark by I mark detector 29 will assure that a logical one is shifted into the first memory location of shift register 26 upon the next occurrence of a motion signal.

As will be known to those skilled in the art, if several motion pulses occur at point 38, and both E mark detector 28 and I mark detector 29 have failed to detect the presence of the respective signals, zeros will be shifted into the first memory locations of shift registers 25 and 26 upon each occurrence of a motion signal and the ones which denote the location of previously detected marks will be shifted from memory location N to memory location N +1 one upon each occurrence of a motion signal.

It may thus be seen that during a rewind scan operation, the circuitry of FIG. 2A will detect the presence of E marks and I marks recorded on the tape and will provide a logical one as the contents of the first memory location of shift registers 25 and 26 whenever such a mark is detected and a motion signal occurs at point 38. Upon each occurrence of a motion signal, the contents of each memory location of shift registers 25 and 26 will be shifted to the next contiguous memory location and therefore the contents of memory locations representing the position of an E mark or an I mark will be shifted to the right.

Consider for a moment that the circuitry of FIG. 2A is in a state in which a logical one is present in the second memory location of shift register 25 and all other locations of shift register 25 are equal to zero. Further assume that a logical one is present in the first memory location of shift register 26 and all other memory locations of shift register 26 are equal to zero. Assume also that during the period used in this example, no further E marks or I marks are detected.

The logical one present in the second memory location of shift register 25 appears as a logical one on line E2 which is provided as one input to NOR gate driver D2. The logical one on line E2 causes the output of NOR gate driver D2 to go to its logical zero state and thus causes current to flow through light-emitting diode L2 causing this diode to light. Since light-emitting diode L2 corresponds to the second segment of array 10 shown in FIG. 1A, it may be seen that the second segment from the left-hand end of array 10 will remain constantly lit indicating the presence of an E mark.

The I mark located in the first memory location of shift register 26 is provided along line I1 as an input to AND gate A1. The other input to AND gate A1 is provided by blink clock 85 which is an oscillator providing pulses at a predetermined frequency. Therefore pulses corresponding to the output of blink clock 85 will appear on line I1' and therefore as an input to NOR gate driver D1. Since one input to NOR gate driver D1 is continuously pulsed, and the remaining two inputs to NOR gate driver D1 are zero, light-emitting diode L1 will intermittently conduct current and be cut off. It may therefore be seen that light-emitting diode L1 which corresponds to the left-handmost segment of array 10 in FIG. 1B will blink intermittently indicating the presence of an I mark.

Upon the next occurrence of the motion signal at point 38, zeros will be present at DATA IN inputs 49 and 50. This will cause a zero to shift into the first memory location of both shift registers 25 and 26. The logical one which was the contents of the second memory location of shift register 25 will be shifted to the third memory location of shift register 25 while at the same time the logical one which was the contents of the first memory location of shift register 26 will be shifted to the second memory location of shift register 26. It will thus be apparent, that a logical one output will now be present on line E3 from shift register 25 and through the action of NOR gate driver D3 will continuously light light-emitting diode L3 which corresponds to the third segment from the left of array 10. The logical one which is now present in the second memory location of shift register 26 will cause pulses corresponding to the pulses emitted by blink clock 85 to appear on the line I2' and through the action of NOR gate driver D2 will intermittently light light-emitting diode L2. Therefore when the aforementioned motion signal appears at point 38, the continuously lighted segment representing location of an E mark and the intermittently lighted segment representing the location of an I mark each shift one position to the right in array 10 shown in FIG. 1B.

It will be further appreciated that if an E mark and an I mark both occur in the same segment of tape between consecutive motion signals, that the E mark will "override" the I mark and the segment corresponding to that location will remain continuously lit due to the characteristics of the NOR gate drivers D1-D60.

Next assume that the rewind scan operation has stopped. This assumption should be made without regard to whether the tape has been completely rewound or only partially rewound. Assume that the operator of transcribe station 5 now begins to move tape 7' in a forward direction in order to begin transcribing the recorded dictation contained on tape 7'. When the circuitry of FIG. 2A is in this state, direction sensor 39 is providing a logical zero on line 40. Thus a logical zero is provided as one input to NAND gate 60 which maintains a logical one at point 61. This logical one is inverted by inverter 62 and maintains a logical zero on line 65 as one input to AND gate 67. The presence of a logical zero as one input to AND gate 67 assures that a logical zero is maintained on line 76 and that line 76 remains insensitive to the presence of motion signals appearing at point 38. It may therefore be seen that when a logical zero is present on line 40, line 76 will be maintained in its logical zero state and no pulses will appear at the shift inputs 47 and 48 of shift registers 25 and 26. Therefore, the contents of shift registers 25 and 26 will remain in the state in which they were left when forward motion of the tape first began. It will be appreciated that as the contents of memory locations and shift registers 25 and 26 have been shifted to the right during the rewind scan operation, the contents of these registers will remain constant when the operator of transcribe station 5 moves tape 7' in a forward direction. It will further be appreciated that the contents of shift registers 25 and 26 have been entered from the left-hand side of shift registers 25 and 26 which corresponds to entry from the left-hand end of array 10 and thus the display appearing in array 10 will be left justified to the farthest rewound position of the tape.

The logical zero on line 40 also appears on line 58 as direction input 55 and thus will condition shutter shift register 27 to shift right upon the occurrence of pulses at shift input 56. Recall that point 61 is now at a logical one state. The logical one at point 61 is provided as an input to NAND gate 72. NAND gate 72 will then cause the state of line 75 to be at the inverse of the logical state at point 38. Therefore, line 75 will remain in its logical one state until the occurrence of a motion signal at point 38. The occurrence of a positive going pulse as a motion signal at point 38 will cause a negative going pulse to appear on line 75 that will be provided to shift input 56 of shutter shift register 27. The rising edge of the pulse appearing on line 75 will cause the memory contents of shutter shift register 27 to shift to the next contiguous memory location to the right. Since the DATA IN RIGHT (DIR) input 51 is tied to a logical one state, a logical one will then become the contents of the first memory location of shutter shift register 27.

Similarly upon the next occurrence of a motion signal at point 38, the logical one that was previously the contents of the first memory location of shift register 27 will become the contents of the second memory location, and another logical one from DATA IN RIGHT input 51 will be shifted into the first memory location. Recall that as long as a logical zero appears on line 40, the contents of shift registers 25 and 26 will remain constant. Therefore, in the state described both lines S1 and S2 will be in their logical one states and since these lines appear as inputs to NOR gate drivers D1 and D2 respectively, light-emitting diodes L1 and L2 will remain constantly lit. Upon the next occurrence of a motion signal at point 38 the first three memory locations of shutter shift register 27 will contain logical ones and light-emitting diodes L1–L3 will remain constantly lit.

It will therefore be apparent that as tape is moved in a forward direction, a band or shutter of continuously lighted segments will appear from the left-hand end of array 10 and proceed toward the right-hand end of array 10. It will also be appreciated that the presence of a logical one in memory location N of shutter shift register 27 (N equal to a positive integer less than or equal to sixty) necessarily implies that the first N light-emitting diodes L1–LN will remain continuously lit without regard to the contents of shift registers 25 and 26.

Next assume, that from the state described immediately above, the operator of transcribe station 5 again proceeds to rewind tape 7'. Under these conditions, the output on line 40 will be a logical one and this logical one will be provided along line 58 to direction input 55 conditioning shutter shift register 27 to shift in a left-hand direction. Since the contents of some memory locations of shutter shift register 27 are equal to one, zero output 57 will be held to a logical zero state. This logical zero will be provided along line 59 as the other input to NAND gate 60. Since a logical zero is provided along line 59, NAND gate 60 assures that point 61 remains in a logical one state without regard to the state of line 40. The logical zero on line 61 again maintains a logical zero on line 65 through the action of inverter 62 and therefore maintains a logical zero on line 76 preventing shifting of the contents of memory locations of shift registers 25 and 26.

As motion signals appears at point 38, negative going pulses appear on line 75 as the output of NAND gate 72 and upon each rising edge of these pulses, the contents of shutter shift register 27 shifts left. Each time the contents of shift register 27 shifts left, a zero is entered in memory location 60 of shift register 27 since the DATA INPUT LEFT (DIL) input 52 is tied to a logical zero state.

This state of events persists until the tape reaches the point where the last motion pulse occurs at point 38 prior to reaching the actual farthest rewound position. Upon completion of this pulse, the display control circuitry again assumes a state wherein it will execute a rewind scanning operation. When the last logical one shifts out of the first memory location of shutter shift register 27, ZERO output 57 goes from a logical zero to a logical one state.

Assume that the operator of transcribe station 5 continues to rewind after this point is reached. The transition from logical zero to logical one which appears at ZERO output 57 has two results. The first result is to reestablish the conditions described above wherein the circuitry will be responsive to perform a rewind scanning operation. Note that a logical one now appears on line 59 and a logical one also appears on line 40. This provides two ones as inputs to NAND gate 60 which provides a zero at point 61 and a logical one on line 65. As explained above, this state holds line 75 at its logical one condition thus preventing shifting of the contents of memory locations of shutter shift register 27 and enabling AND gate 67 to pass pulses which appear on line 66 onto line 76 thereby activating shift inputs 47 and 48 of shift registers 25 and 26.

The second result of the transition from zero to one at ZERO output 57 is that this transition appears on line 86 and triggers a positive edge triggered one shot multivibrator 87. One shot multivibrator 87 produces a short pulse on line 88 which, through the action of OR gate 79, appears at point 80 and thus on lines 71 and 81. During forward movement of the tape, it is also possible to move the tape in a fast foward direction and have the shutter advance to the right. As was explained above, the contents of shift registers 25 and 26 do not shift under these conditions. However, it is possible for the transcriptionist to wind the tape in a forward direction past several recorded E marks. Upon rewinding the tape again, E mark detector 28 and I mark detector 29 would encounter recorded E marks and I marks and such encounters would set flip-flops 69 and 82. It is therefore necessary to clear flip-flops 69 and 82 once the segment of tape which contains the previous farthest rewind position of the tape is entered so that a spurious indication of an E mark or an I mark will not be shifted into shift register 25 or 26 upon the next occurrence of a motion signal at point 38.

As will be apparent to those skilled in the art, the circuitry of FIG. 2A will unambiguously and properly record all E marks and I marks unless the detection of an E mark or an I mark occurs simultaneously with a motion signal from point 38. It is to be noted that the transition from zero to one at ZERO output 57 denotes that the particular segment of tape containing the farthest rewound position of the tape has been entered. In the preferred embodiment disclosed herein, the segments of tape between motion pulses represent approximately thirty seconds of dictated material. However, the provision of a greater number of memory locations in the shutter shift register, will increase the resolution and thus it could be determined with more accuracy when the farthest rewound position of the tape had been reached. From the foregoing it will be apparent to those skilled in the art that shutter shift register 27 not only provides contiguous memory locations for signals representing location of the shutter, but also provides an advance position means for determining when the tape has been wound to its previous farthest rewound position.

After the clearing of flip-flops 69 and 82 by the pulsed output of one shot multivibrator 87, a rewind scan operation will continue as described hereinabove until the beginning of the tape (end of the rewind) has been reached. At this point, the farthest left-hand segment of array 10 shown in FIG. 1B (which corresponds to LED L1 of array 10' shown in FIG. 2A) will represent the beginning of dictation on the tape 7' at transcribe station 5.

From the foregoing it should also be apparent that at any given point during operation of transcribe station 5, light-emitting diode L1 will correspond to the segment of tape containing the farthest rewound position at that time. It will furthermore be apparent that any sequential combination of forward movement of the tape and reverse movement of the tape may be performed by the operator of transcribe station 5 and the display of FIG. 1B will always be left justified, the leftmost end representing the farthest rewound position. When the tape is being moved within a segment of tape which has been advanced forward of the farthest rewound position, shutter shift register 27 will shift its memory contents left and right and the shutter will appear in array 10 and correspondingly move left and right. When the farthest rewound position has been reached, the entire contents of shutter shift register 60 will be equal to zero, ZERO output 57 will go to its logical one state, and shift registers 25 and 26 will begin to accept newly detected E marks and I marks.

Turning to FIG. 2B, light-emitting diodes 111, 112, 115 and 116, correspond to segments 11, 12, 15 and 16 respectively of the display output shown in FIG. 1B. Since tape present sensor 41 provides a logical one when a tape is present in transcribe station 5, and fast motion sensor 42 provides a logical one to point 45 when it detects that the tape is in a fast rewind mode, it will be apparent to those skilled in the art that the logic gates within block 90 will turn off light-emitting diodes 111, 112, 115 and 116 whenever a tape is not present in transcribe station 5; and that light-emitting diode 111 will be illuminated when the transcribe station is in an erase mode, LED 112 will be illuminated when the transcribe station is in a fast forward mode, LED 115 will be illuminated when tape is being reversed, and LED 116 will be illuminated when the transcribe station is in a listen or forward play mode.

THE DICTATION DISPLAY OF THE PRESENT INVENTION

Figure 3A:
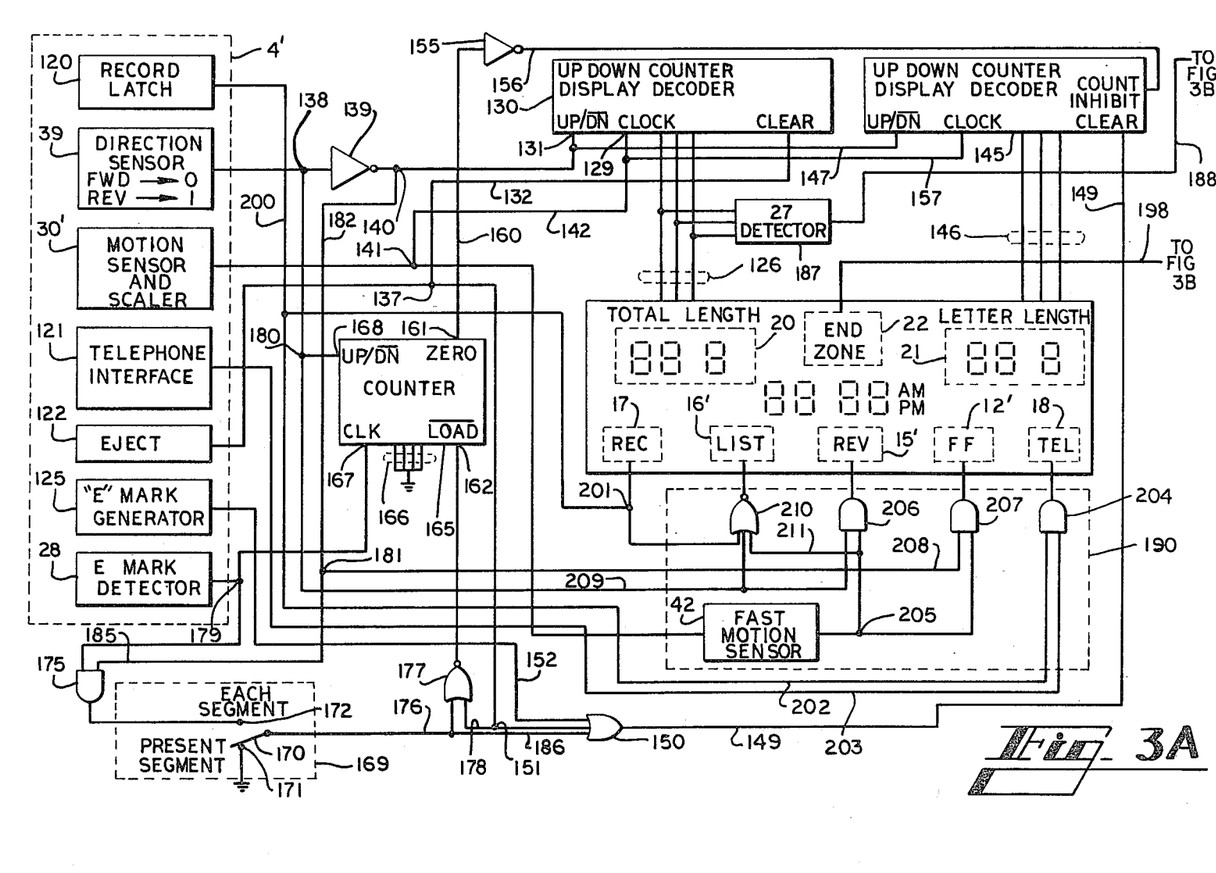
FIG. 3A is a partially schematic and partially block diagram of a preferred embodiment of the circuitry controlling the dictation display as shown in FIG. 1C.
Figure 3B:
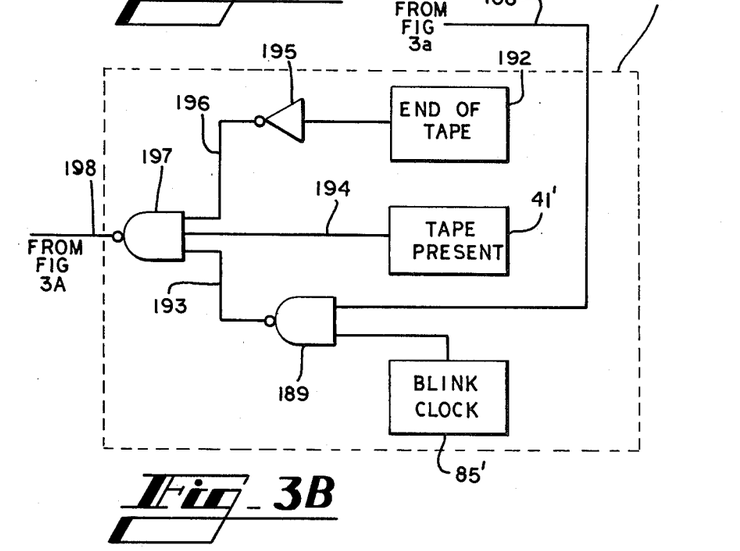
FIG. 3B is a schematic diagram of the circuitry controlling the end zone segment of the dictation display of FIG. 1C.

FIGS. 3A and 3B show a preferred embodiment of the circuitry controlling the dictation display shown in FIG. 1C of the present invention. To interface with this control circuitry several logical sensors are provided in dictate station 4 shown in FIG. 1A. This is indicated by the block 4' on FIG. 3A. These sensors include record latch 120 which provides a logical one output when the dictate station is in a record mode, direction sensor 39 which is identical to direction sensor 39 shown in FIG. 2A, motion sensor and scaler 30' which is identical to block 30 shown in FIG. 2A except that it is scaled to provide approximately ten motion signals per minute of tape rather than two as does block 30 in FIG. 2A. Logical sensors also include telephone interface sensor 121 which provides a logical one when the source of signals coming into the dictate station is a conventional telephone interface, eject sensor 122 which provides a logical one plus when an eject command is received by the dictate station, and E mark generator 125. E mark generator 125 as shown in FIG. 3A provides a logical one pulse whenever the E mark generator is activated to record a signal denoting an E mark on the tape. The signal path for the actual E mark signal is not shown and it is to be understood that E mark generator 125 as shown in FIG. 3A only shows an output providing a pulse indicating that an E mark is being recorded. E mark detector 28' is identical to E mark detector 28 as shown in FIG. 2A except that E mark detector 28' will also detect E marks when tape is being run at a normal playback speed. The addition of a filter in parallel with apparatus such as E mark detector 28 in order to implement this function will be apparent to those of ordinary skill in the art.

THE TOTAL LENGTH COUNTER

Total length display indicator 20 indicates the total distance between the beginning of the tape in a cassette at dictate station 4 and the present location of the tape with respect to the record head. This assumes the cassette was completely rewound when placed in the dictate station. When an unrewound cassette is placed in dictate station 4, the "zero" of the total length counter corresponds to the point to which the tape was wound when placed in the dictate station. Total length display 20 is driven by up/down counter/display decoder 130 through lines 126. It will be understood by those of ordinary skill in the art, that while three lines are shown as 126, one for each segment of display 20, each of these lines 126 may comprise a plurality of individual conductors for the control of each segment or lines carrying appropriate multiplexed signals.

Up/down counter/display decoder 130 is a combination up/down counter and seven segment display decoder (hereinafter "counter 130"). As will be known by those of ordinary skill in the art, up/down counter/display decoders such as counter 130, are available on a single large scale integrated circuit. An example of such an LSI circuit is the current MOSTEK MK 50398 or 50399. Counter 130 includes an UP/NOT DOWN input 131 and clock input 129. As is known to those of ordinary skill in the art, such a counter will count up when input 129 is pulsed while input 131 remains in its logical one state and will count down when input 129 is pulsed when input 131 remains in its logical zero state. This counter also includes a CLEAR input which is connected to line 132. A positive going pulse on line 132 will set the counter to zero. It will therefore be appreciated that counter 130 provides a counting means responsive to motion sensor 30' for maintaining a sum.

Upon the ejection of a tape from dictate station 4, eject sensor 122 provides a logical one pulse to point 137 which is provided along line 132 to the clear input of counter 130. Thus it may be seen that upon each ejection of a cassette from dictate station 4 counter 130 is cleared and total length display 20 will read all zeros.

Since counter 130 is provided to indicate the present location of the tape relative to the beginning of the tape, its count is independent of whether dictate station 4 is in a record mode, a listen mode, or a fast wind mode. It will therefore be apparent to those of ordinary skill in the art that the inputs controlling counter 130 will only be motion signals provided by motion sensor and scaler 30' and direction signals provided by direction sensor 39.

Direction sensor 39 is the same as direction sensor 39 shown in FIG. 2A and described above. It provides its output to point 138. The logical state at point 138 is inverted by inverter 139, the output of which appears at point 140. As the tape proceeds to be wound in a forward direction either by a fast forward operation, a listen operation or a record operation, motion sensor 30' begins providing pulses which are referred to as motion signals herein to point 141. Point 141 is connected by line 142 to clock input 129. Therefore when tape is moving forward UP/DOWN input 131 is held to a logical one and counter 130 counts up when pulses appear at CLOCK input 129. When tape is moving in a reverse direction input 131 is at a logical zero and counter 130 counts down when input 129 is pulsed. As counter 130 counts, its outputs are provided along lines 126 to total length display 20.

Letter length display 21 which will also be referred to as present segment display is controlled by up/down counter display decoder 145 (hereinafter "counter 145"). Counter 145 is of the same type as counter 130 and normally responds to its inputs in the manner that counter 130 responds since the UP/NOT DOWN input of counter 145 is connected by line 147 to point 140 and the clock input of counter 145 is connected by line 157 to clock input 129. Present segment display 21 is driven by lines 146 from counter 145. It will therefore be appreciated that counter 145 also comprises a means for maintaining a sum which is responsive to motion signals from motion sensor 30'.

The CLEAR input of counter 145 is connected to line 149 which is the output of OR gate 150. One input to OR gate 150 is provided from point 151 which will be at the same logic level as point 137. Therefore whenever eject sensor 122 provides a pulse to point 137 indicating that a tape has been ejected from dictate station 4, this pulse is also provided to point 151 and through the action of OR gate 150 appears at point 149 thus clearing counter 145.

The other inputs to OR gate 150 are lines 152 and 186. Line 152 is the output of E mark generator 125. As explained above, the output of E mark generator 125 is a pulse whenever an E mark is being recorded on tape 7. Therefore whenever dictator 6 provides a function control which records an E mark on tape 7, a pulse appears on line 152 which passes through OR gate 150 to line 149 and clears counter 145. It may therefore be seen that counter 145 will be cleared thus setting present length display segment 21 to zero upon the occurrence of an ejection of a cassette from dictate station 4 or the recording of an E mark by dictator 6. Therefore, whenever an E mark is recorded indicating the end of the present segment of dictation, present segment display 21 clears to zero and is conditioned to begin counting the length of the next segment of dictation.

Counter 145 has a COUNT INHIBIT input connected to line 156. When a logical one appears on line 156, counter 145 will not respond to pulses on line 157. Inverter 155 causes line 156 to carry the logical innerse of line 160. It may therefore be seen that when a logical one appears on line 160, counter 145 will count in exactly the same manner as counter 130. Therefore it is the logic state of line 160 which may inhibit counter 145 from counting during times when counter 130 continues to count.

Line 160 is connected to a ZERO output 161 of up/down counter 165. Up/down counter 165 is of a type similar to a TTL74190 counter which is well known to those of ordinary skill in the art. This counter includes a LOAD input 162 which will load the contents of parallel inputs 166 into counter 165 when a logical zero condition appears at LOAD input 162. The counter also has a CLOCK (CLK) input 167 and an UP/DOWN input 168. Counters of this type will count up when a logical one appears at UP/DOWN input 168 and CLOCK input 167 is pulsed. These counters will count down when a logical zero appears at input 168 and CLOCK input 167 is pulsed. Note that parallel inputs 166 are connected to ground which is a logical zero condition and therefore the appearance of a logical zero at LOAD input 162 will be the equivalent of a clear function to counter 165.

ZERO output 161 provides a logical one output on line 160 when the count of counter 165 is zero. It will be obvious to those of ordinary skill in the art that such an input may be derived by use of a NOR gate having the same number of inputs as counter 165 has bits.

Counter 165 as shown in FIG. 3A is the basic element which is responsive to a condition of rewinding tape 7 out of the present dictation segment. It is also responsive to reentry into the present segment and can be made selectively responsive to make counter 145 count through previously dictated segments by the use of switch 169.

Switch 169 is a single pole double throw switch including a contact 170 which may be connected to a logical zero condition at point 171 as shown or to point 172 which will connect contact 170 to the output of AND gate 175. Contact 170 is connected by line 176 to one input of NOR gate 177.

To make counter 145 responsive only to movement within the present dictation segment, assume that contact 170 is in the position shown in FIG. 3A wherein it contacts point 171 and thus provides a logical zero on line 176. As will be known to those of ordinary skill in the art, the maintenance of a logical zero on line 176 will cause NOR gate 177 to provide the inverse of the logic state appearing on line 178 to load input 162. Note that line 178 is connected to point 137. Under these conditions, the logical zero which normally appears at point 137 is provided to line 178, will be inverted by NOR gate 177 and a logical one will be maintained at LOAD input 162.

When dictator 6 ejects tape 7 from dictate station 4, ejection detector 122 provides a positive pulse to point 137 which is again provided along line 178 and inverted by NOR gate 177. This provides a negative going pulse at LOAD input 162 which loads all zeros into counter 165 thus clearing the counter. It may therefore be seen that when switch 169 is in the state depicted in FIG. 3A, only a pulse from ejection detector 122 will asynchronously clear counter 165.

Under these same conditions, assume that dictator 6 has completed a first dictation segment, provided an E mark on tape 7 which provides a pulse from E mark generator 125 clearing counter 145 and proceeds to dictate a second dictation segment which will be referred to as the present dictation segment. As the dictator proceeds into the present dictation segment, counter 145 counts up. Since E mark detector 28' has yet to detect an E mark the count of counter 165 has remained zero throughout this operation. It is to be understood that E mark detector 28 will not provide an output pulse when an E mark is being recorded on the tape but only in response to the detection of E marks previously recorded on the tape.

Next assume that dictator 6 decides to rewind the tape out of the present dictation segment and into the previous or first dictation segment. Upon activation of rewind, counters 130 and 145 begin counting down. When the E mark which denotes the end of the first segment of dictation and the beginning of the present segment of dictation is detected by E mark detector 28 a pulse is provided at point 179 and thereby provided to clock input 167 of counter 165. Since direction sensor 39 is providing a logical one at point 138 this logical one is provided to point 180 and thus counter 165 increments its count to one.

When counter 165 counts to one, a logical zero appears at ZERO output 161 and is provided along line 160 to INVERTER 155 causing a logical one to appear on line 156 and thus counter 145 ceases counting. It should also be apparent that counter 145 was cleared to zero when the E mark denoting the end of the first segment of dictation was recorded and therefore counter 145 will be at its zero count when this E mark is again encountered on rewind. It will therefore be apparent that as long as counter 165 contains a non-zero count, counter 145 will remain in its zero count state since it is inhibited by the presence of the logical one on line 156. It will therefore be appreciated that counter 165 and inverter 155 comprise a control means for rendering counter 145 unresponsive to motion signals from motion sensor 30' upon detection of a particular last recorded end mark as evidenced by the nonzero count of counter 165.

Dictator 6 may then move the tape in any desired fashion within the first dictation segment without affecting the count of either counter 145 or counter 165. When the dictator advances the tape past the E mark denoting the end of the first segment and the beginning of the present and second segment, E mark detector again provides a logical one pulse at point 179. Since the tape is moving in a forward direction, direction sensor 39 will provide a logical zero at point 180 which in turn is provided to UP/DOWN input 168 of counter 165 and causes counter 165 to decrement its count back to zero when a pulse appears at CLOCK input 167. This reestablishes the logical one at ZERO output 161 and a logical zero on line 156 and counter 145 then proceeds to count upward.

If the dictator had recorded several previous dictation segments prior to rewinding the tape out of the present dictation segment, counter 165 will count the number of E marks encountered during rewind to a previous segment. As soon as the first E mark is counted, counter 145 is inhibited from counting and will remain at its zero count. Upon advancing the tape back toward the present dictation segment, counter 165 will be decremented upon each E mark detected by detector 28 and when the E mark which denotes the end of the next to last dictation segment and the beginning of the present dictation segment is encountered, the logical one appearing at zero output 161 will enable counter 145 to begin counting. It may therefore be seen that when a dictator rewinds the tape out of the present dictation segment, counter 145 and thereby present segment display 21 will remain at a zero count until the present segment of dictation is reentered by winding the tape forward.

Counter 145 and thus present segment display 21 may be made selectively responsive to begin counting at the beginning of any previously recorded dictation segment. This is accomplished by placing switch 169 in a state wherein contact 170 is connected to point 172. In this configuration, counters 165 and 145 will respond as previously described during rewind past the E marks denoting the end of previous dictation segments. Note that during rewind a logical one is provided at point 138 which provides a logical zero at point 140. Point 140 is connected to point 181 by line 182. Point 181 is also connected to line 185 which is one input to AND gate 175. Therefore, when direction sensor 39 detects that the tape is being rewound, a zero appears on line 185 maintaining a logical zero at point 172 through the action of AND gate 175.

When the dictator stops in a previously recorded dictation segment and begins to advance the tape in a forward direction, point 140 and line 185 go to a logical one state. Upon the next encounter of a recorded E mark, a pulse appears at point 179 and is provided as the other input to AND gate 175. Therefore, a pulse will appear at point 172 which, in the configuration described, will provide a negative going pulse at load input 162 through the action of NOR gate 177. As previously described, this will load all zeros into counter 165 which causes a logical one to appear at zero output 161 thereby enabling counter 145 to proceed to count upward. Note that the positive pulse provided by AND gate 175 is also provided along line 186 as another input to OR gate 150. The pulse appearing on line 186 will therefore appear on line 149 clearing counter 145 to its zero count. Upon the first encounter of an E mark going in the forward direction this operation will be redundant since counter 145 will already be at its zero count. However, when dictator 6 advances the tape in a forward direction through another E mark, it is necessary to clear counter 145 in order to indicate that another previously recorded dictation segment has been entered.

It will therefore be appreciated that when switch 169 is in a configuration where contact 170 contacts point 172, counter 145 will remain at its zero count as the tape is rewound through previous dictation segments. It will further be appreciated that upon advancing the tape (either in a fast forward or a listen mode) counter 145 will be reset to zero at the beginning of each dictation segment and will perform as an up/down counter during tape movement within that segment. Thus it may be seen that in the second mode described herein, counter 145 will respond to detection of an E mark when tape is moved in a forward direction so as to make the dictation segment which begins with said E mark be treated as the present dictation segment.

As will be appreciated by those skilled in the art, counter 165 provides a means for detecting the end of the last dictation segment prior to the present dictation segment and further provides a means for detecting reencounter of this particular end mark during forward advancement of the tape. It will also be appreciated by those skilled in the art that counter 165 may be made responsive to motion signals provided by motion sensor 30' rather than the detection of recorded E marks and will still perform an equivalent function.

Control of End Zone Segment

End zone segment 22 is provided to alert dictator 6 that a predetermined amount of tape remains for the recording of dictation. End zone segment 22 also alerts dictator 6 when the end of tape has been reached. The circuitry controlling segment 22 is shown in FIG. 3B. FIG. 3B shows a connection of positive logic controlling end zone segment 22. Therefore when a logical one appears on line 198, segment 22 will be lighted. In the preferred embodiment of the present invention, three minutes of recording time is the selected amount of remaining tape which will activate end zone segment 22. Note that the total length counter 130 has connected to its outputs 126 twenty-seven detector 187 FIG. 3A. This detector provides a logical one on line 188 whenever the count of counter 130 is equal to or greater than a count which corresponds to a total length count of twenty-seven minutes. Implementation of such a detector by the use of conventional gates and the outputs of counter 130 will be apparent to those skilled in the art. The output of "27" detector 187 is provided along line 188 as one input to NAND gate 189. The circuitry controlling end zone segment 22 is shown in block 191. The other input to NAND gate 189 is from blink clock 85' which is substantially similar to blink clock 85 shown in FIG. 2A and described hereinabove. Also included in block 191 is end of tape detector 192 which provides a logical one output when the end of recording tape 7 is detected. For example, a retriggerable one shot may be repeatedly triggered by motion of the supply spindle and its output gated to provide a logical one when the dictate station is in a mode of operation for causing tape movement and the one shot is not triggered. End of tape detector 192 is conventional in nature and per se forms no part of the present invention. Tape present indicator 41' is substantially similar to and provides the same output as tape present detector 41 shown in FIG. 2B.

When counter 130 is at a count which represents less than 27 minutes of tape, the zero provided along line 188 causes NAND gate 189 to provide a logical one on line 193 as one input to NAND gate 197. A logical one provided by tape present detector 41' is provided on line 194 as another input to NAND gate 197. End of tape detector 192 will provide a logical zero output since the end of tape has not been reached. This logical zero is inverted by inverter 195 which provides a logical one on line 196 as the third input to NAND gate 197. Therefore, so long as counter 130 is in a state indicating less than twenty-seven minutes of tape having been used, all three inputs to NAND gate 197 will be one and therefore a logical zero will be maintained on line 198 keeping end zone segment 22 unlit.

If the tape is removed from dictate station 4, tape present detector 41' will provide a logical zero along line 194 forcing line 198 to remain in its logical one state thus constantly illuminating end zone segment 22.

When counter 130 reaches a state indicating that twenty-seven or more minutes of tape have been used, a logical one appears on line 188. This logical one will cause NAND gate 189 to invert the output of blink clock 85' thus providing pulses on line 193. During the negative portion of each pulse appearing on line 193, a logical one will appear on line 198. It may thus be seen that when line 188 is in its logical one state, the pulses comprising the output of blink clock 85' will be inverted by NAND gate 189 and again inverted by NAND gate 197 so that the output appearing on line 198 will be identical to the output of blink clock 85'. This will cause end zone segment 22 to be lighted intermittently and thus to flash whenever tape 7 is in the zone containing the last three minutes of tape available for recording dictation. The machine will persist in this state until tape 7 is rewound past a point where more than three minutes of tape are remaining or if forward advancement of the tape continues until end of tape is reached. If the tape is rewound past the point where more than three minutes of tape remain, a logical zero is again established at output 187 thus reestablishing three ones as the inputs to NAND gate 197 and extinguishing end zone segment 22.

If the tape is advanced to end of tape, end of tape detector 192 provides a logical one output which is inverted by inverter 195 to a logical zero on line 196. The logical zero on line 196 maintains a logical one on line 198 thus maintaining end zone segment 22 in a constantly illuminated state.

It may therefore be seen that end zone segment 22 will be extinguished when more than a predetermined amount of tape remains for the recording of dictation in tape 7 (three minutes in the preferred embodiment). End zone segment 22 will be lighted intermittently when an amount of tape equal to or less than a predetermined amount remains to be recorded; and end zone segment 22 will remain constantly illuminated when end of tape is reached or when no tape is present in dictate station 4.

Function Segments

The circuitry controlling function segments 12', 15', 16', and 18 are shown in block 190 on FIG. 3A. It will be apparent to those skilled in the art that the circuitry in block 190 will illuminate the proper function segment when the dictate station is in a mode corresponding to that particular function. The logic controlling the function segments is also shown as positive logic and a logical one input to a segment will light that segment. Note that record segment 17 is lighted whenever record latch 120 is providing a logical one on line 200 which is in turn provided to point 201. When the source of recorded signals is telephone interface 121, a logical one is provided along line 203 and thus when recording of dictation from telephone interface 121 is in progress both inputs to AND gate 204 will be ones causing telephone segment 18 to be illuminated.

Fast forward segment 12' and reverse segment 15' both requires a logical one output from fast motion sensor 42 to be provided to point 205 in order to become illuminated. Fast forward segment 12 will be illuminated when line 208 provides another logical one as the other input to AND gate 207. Since line 208 is connected to point 181, this condition will prevail when direction sensor 39 detects that tape is being moved in a forward direction. Thus when the tape is moved in a forward direction line 208 will become a logical one and when it is moved fast forward point 205 will go to a logical one thus providing a one as the output of AND gate 207.

Point 205 from fast motion sensor 42 is one input to AND gate 206 and the other input is from line 209 which is connected to point 180. Thus it may be seen that when the tape is moving in a reverse direction (which is always a fast wind mode) reverse segment 15' will be illuminated. NOR gate 210 controls listen segment 16. In order for NOR gate 210 to provide a logical one output all three inputs thereto must be zero. One input to NOR gate 210 is from point 201 which is in a logical zero when record latch 120 indicates that no recording is taking place. A second input to NOR gate 210 is provided on line 209 which provides a logical zero when the tape is moving in a forward direction. The remaining input to NOR gate 210 is from line 211 which provides a logical zero when fast motion sensor 42 fails to detect fast movement of the tape. Thus it may be seen that listen segment 16' will be illuminated when the tape is moving in a forward direction, record latch 120 is not set, and the tape is not in a fast wind mode.

It is to be understood that circuitry (not shown) is provided to blank the function segments of the display when the dictate station is in a stop mode.

The foregoing description of a preferred embodiment has been exemplary and for illustrative purposes. Other embodiments of the present invention are possible and considering the disclosure of the invention herein, such embodiments will be apparent to those of ordinary skill in the art. Therefore the scope of the present invention is to be limited only by the claims appended hereto.

We claim:

1. In a record member playback apparatus including a transport for moving the record medium of a record member alternately in a first direction and a second direction, advance position means for providing an advance signal in response to said record medium being at the farthest position from an arbitrary starting point said record medium has been moved in said first direction past a predetermined reference point; detection means for providing a location signal upon each occurrence corresponding to detection of one of a plurality of signals of a predetermined characteristic recorded on said record medium; means for providing a motion signal in response to an increment of said record medium moving past said predetermined reference point in either said first direction or said second direction; an improved apparatus for indicating the location of said plurality of signals of a predetermined characteristic comprising:

a plurality of selectively actuable light sources;
a sequential plurality of memory locations including a first memory location,
each of said plurality of light sources being associated with one of said plurality of memory locations, each of said memory locations storing a binary signal;
input means for entering a binary memory location signal as the contents of said first memory location upon each occurrence of said location signal during the concurrent presence of said advance signal;
shift means associated with said plurality of memory locations for moving said binary signal of each of said plurality of memory locations in a first memory direction to a next contiguous memory location upon each occurrence of said motion signal during the concurrent presence of said advance signal and
disabling means responsive to said advance position means for rendering said input means unresponsive to said detection means and for disabling said shift means during the absence of said advance signal.

2. Apparatus as recited in claim 1 wherein:
said record member playback apparatus is characterized by a surface including a right side and a left side;
said plurality of light sources is disposed as a linear array from left to right on said surface of said record member playback apparatus; and
said first memory direction corresponds to movement from left to right in said linear array.

3. Apparatus as recited in claim 1 wherein:
said plurality of memory locations is a first plurality of memory locations, said input means is a first input means, said shift means is a first shift means; further including:
a second sequential plurality of memory locations including a beginning location, each of said second plurality of memory locations storing a binary signal, each of said plurality of light sources being associated with one of said second plurality of memory locations;
second input means associated with said second plurality of memory locations for entering a shutter location signal into said beginning location upon each occurrence of said motion signal when said advance signal is absent and said record medium is moving in said second direction;
second shift means associated with said second plurality of memory locations for moving said binary signal of each of said second plurality of memory locations in said first memory direction to a next contiguous memory location upon each occurrence of said motion signal when said advance signal is absent and said record medium is moving in said second direction and for moving said binary signal of each of said second plurality of memory locations in a second memory direction opposite said first memory direction upon each occurrence of said motion signal when said record medium is moving in said first direction.

4. Apparatus as in claim 1 wherein:
said plurality of signals of a predetermined characteristic comprises a plurality of first type signals and a plurality of second type signals;
further including driving means responsive to said plurality of memory locations for selectively actuating each of said plurality of light sources in response to said binary signal stored in said one of said plurality of memory locations associated therewith;
said driving means actuating each said light source to constantly emit light in response to said said binary signal being one of said plurality of said first type signals and actuating each said light source to intermittently emit light in response to said contents being one of said plurality of second type signals.

5. Apparatus as recited in claim 4 wherein:
said plurality of memory locations is a first plurality of memory locations, said input means is a first input means, said shift means is a first shift means; further including:
a second sequential plurality of memory locations including a beginning location, each of said second plurality of memory locations storing a binary signal, each of said plurality of light sources being associated with one of said second plurality of memory locations;
second input means associated with said second plurality of memory locations for entering a shutter location signal into said beginning location upon each occurrence of said motion signal when said advance signal is absent and said record medium is moving in said second direction;
second shift means associated with said second plurality of memory locations for moving said binary signal stored in each of said second plurality of memory locations in said first memory direction to a next contiguous memory location upon each occurrence of said motion signal when said advance signal is absent and said record medium is moving in said second direction and for moving said binary signal stored in each of said second plurality of memory locations in a second memory direction opposite said first memory direction upon each occurrence of said motion signal when said record medium is moving in said first direction;
said driving means is further responsive to said second sequential plurality of memory locations and independently of said binary signals stored in said first plurality of memory locations actuates each of said plurality of light sources to constantly emit light in response to said binary signals stored in said one of said second plurality of memory locations associated therewith being said shutter location signals.

6. A display for indicating the position of a recording medium relative to a reference point as said recording medium is selectively and alternately moved in a first direction and in a second direction opposite to said first direction relative to said reference point comprising:
 a linear display array;
 means responsive to motion of said recording medium in said first direction for providing a linear display in said linear display array having a length which increases from a particular end of said display array as the length of said recording medium moved in said first direction increases; and
 means responsive to motion of said recording medium in said second direction subsequent to motion in said first direction for changing the appearance of a portion of said linear display, said portion having a length which increases from said particular end of said display array as the length of said recording medium moved in said second direction increases.

7. In a system for transcribing dictation recorded on a recording medium as said recording medium was moved in a first direction relative to a transducer;
 motion means for moving said recording medium in said first direction and in a second direction opposite to said first direction;
 transcribing means for transcribing said dictation as said recording medium is moved in said first direction;
 a display array;
 first display means for providing a first display moving from a particular end of said display array having a length proportional to the length of said recording medium moved in said second direction in response to said recording medium being moved in said second direction; and
 second display means response to said recording medium being moved in said first direction subsequent to being moved in said second direction for providing a second display superimposed on said first display and moving from said particular end of said display array having a length proportional to the length of said recording medium subsequently moved in said first direction.

8. The system of claim 7 including third display means responsive to indexing signals recorded with said dictation on said recording medium for providing discrete displays positioned along the length of said first linear display at locations corresponding to the locations at which said indexing signals are recorded on said recording medium.

9. In a record member playback apparatus including a transport for moving the record medium of a record member alternately in a first direction and a second direction;
 a display for indicating how far said transport has moved said record medium from an arbitrary beginning point in said first direction comprising:
 first means for providing a visible indication in said display corresponding to beginning of record medium movement in said first direction;
 second means for moving said visible indicium in a predetermined display direction in response to said record medium moving in said first direction; and
 third means for preventing movement of said visible indicum in response to said record medium moving in said second direction.

10. The display of claim 9 further comprising a fourth means for providing an advance signal corresponding to the farthest position from said arbitrary beginning point said recording medium has moved in said first direction; and
 said third means is responsive to said fourth means to prevent said movement of said movement of said visible indicium when said record medium is moving in said second direction during an absence of said advance signal.

11. A display for indicating the position of a recording medium relative to a reference point as said recording medium is selectively and alternately moved in a first direction and in a second direction opposite to said first direction relative to said reference point comprising:
 a display array;
 means responsive to motion of said recording medium in said first direction for providing a first indicium in said display array having a distance from a particular end of said display array which increases as the length of said recording medium moved in said first direction increases; and
 means responsive to motion of said recording medium in said second direction subsequent to motion in said first direction for providing a second indicium in said display array having a distance from said particular end of said display array which increases as the length of said recording medium moved in said second direction increases.

12. A display for indicating the position of a recording medium relative to a reference point as said recording medium is selectively and alternately moved in a first direction and in a second direction opposite to said first direction relative to said reference point comprising:
 a linear display array;
 means responsive to motion of said recording medium in said first direction for providing a first linear display in said linear display array having a length which increases from a particular end of said display array as the length of said recording medium moved in said first direction increases; and
 means responsive to motion of said recording medium in said second direction subsequent to motion in said first direction for providing a second linear display in said linear display array having a length which increases from said particular end of said display array as the length of said recording medium moved in said second direction increases.

* * * * *